May 5, 1936. W. P. NOLAN 2,039,337
ARTERIAL BLOOD PRESSURE MEASURING DEVICE
Filed Nov. 20, 1935
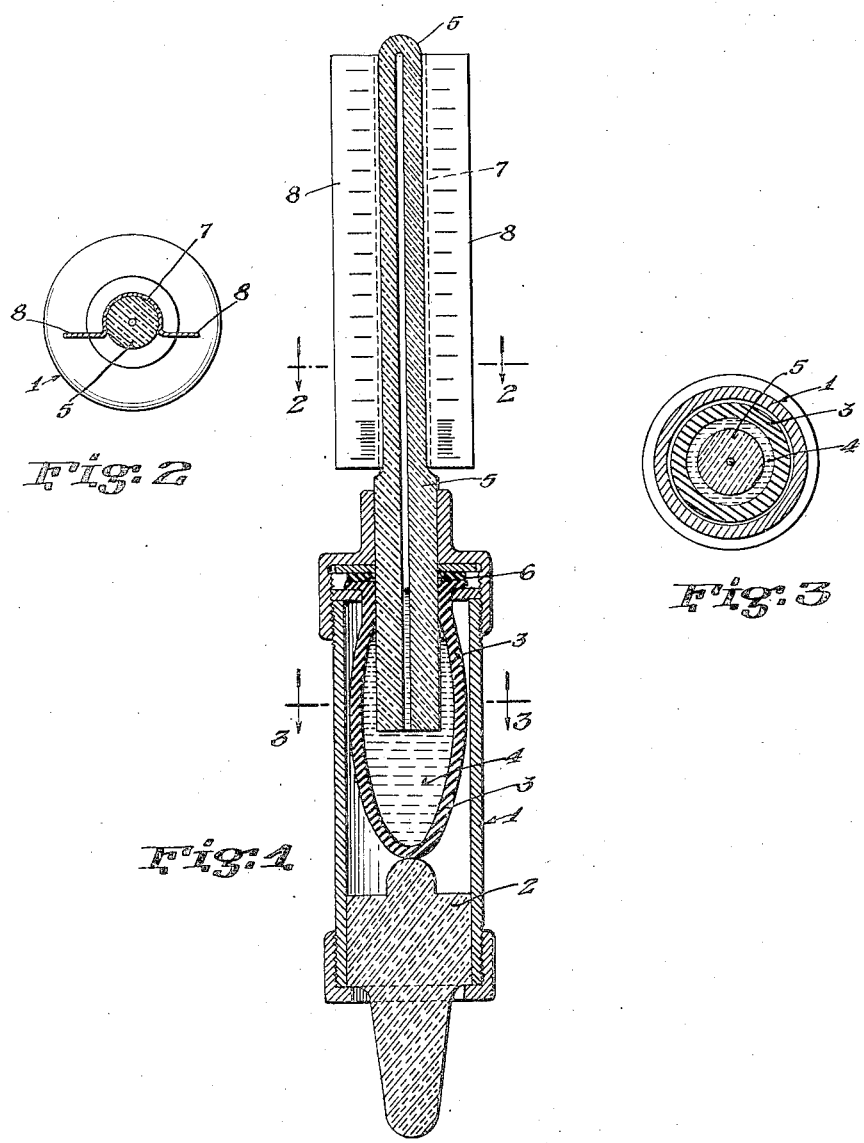
INVENTOR.
William P. Nolan Patented May 5, 1936

2,039,337

UNITED STATES PATENT OFFICE 2,039,337

ARTERIAL BLOOD PRESSURE MEASURING DEVICE

William P. Nolan, New York, N. Y.

Application November 20, 1935, Serial No. 50,678

1 Claim. (Cl. 73—44)

The invention relates to improvements in blood-pressure instruments in which direct pressure is made on the radial artery (pulse) at the wrist joint, with the instrument, by the operator; and the objects of the improvements are first, to provide an instrument which operates without an inflated arm band and rubber bulb; second, to afford facilities for greatly reducing the length of the column of mercury and markings which record the blood pressure.

One form of the invention is illustrated in the accompanying drawing, in which Fig. 1 is a vertical section of the entire instrument; Fig. 2 is a cross section taken on line 2—2 of Fig. 1; Fig. 3 is a cross section, taken on line 3—3 of Fig. 1.

In Fig. 1, I represents the hollow cylinder into which is inserted a piston 2, the lower end of which is shaped to conform to the radial groove at the wrist joint; the upper end ending in the form of a protrusion or knob, which comes in contact with a rubber bag 3, which contains the metal mercury 4. Extending upward from the inside of the rubber bag is a glass column 5, sealed at top, into which the mercury is forced from the rubber bag when pressure is made on the piston from below, and from which the blood pressure is read.

The glass column is secured in position by means of a friction ring, 6. The glass column is surrounded by a protective shell 7 which is bent at right angles on both sides, leaving a clear aperture in front, affording a clear view of the mercury as it rises and falls in the glass tube; and also affording space on its wings 8—8, for lines and numerals by which the blood pressure is computed in millimeters of mercury, from 0 to 300.

The instrument operates by placing the lower end of the piston directly over the radial artery at the wrist and while grasping the instrument at the cylinder, downward pressure is made on the instrument, which forces the piston against the rubber bag, causing the mercury to ascend into the glass column, higher and higher as pressure is exerted against the rubber bag. While pressure is being exerted by the instrument, the index finger of the free hand of the operator is placed on the radial artery, just below the point of contact of the piston with the tissue over the radial artery. When the radial pulse below the piston becomes imperceptible to touch the height of the column of mercury in the glass tube is noted and the reading on the graduated scale opposite the top of the mercury column, indicates the systolic blood pressure in millimeters of mercury. When downward pressure on the instrument is slowly released, the column of mercury falls into the rubber bag and at the instant the radial pulse becomes perceptible to touch, the reading on the scale at the height of the column of mercury, indicates the diastolic blood pressure.

I claim:

A blood pressure measuring device comprising a transparent glass tube, a scale along said tube, a collapsible device containing mercury secured to the lower end portion of the tube and into which the tube extends, a cylinder surrounding said collapsible device, a plunger reciprocable in said cylinder, one end of said plunger engaging the collapsible device for compressing the same, the other end of the plunger having a reduced extension extending outside the cylinder and shaped for engaging and compressing an arterial blood vessel.

WILLIAM P. NOLAN.